US012627075B2

(12) United States Patent
Xue et al.

(10) Patent No.: US 12,627,075 B2
(45) Date of Patent: May 12, 2026

(54) COMPACT CROSS-POLARIZED DIPOLE RADIATING ELEMENTS HAVING EMBEDDED COUPLING LOOPS THEREIN

(71) Applicant: OUTDOOR WIRELESS NETWORKS LLC, Claremont, NC (US)

(72) Inventors: Cheng Xue, Suzhou (CN); Bo Wu, Allen, TX (US); Ligang Wu, Suzhou (CN); Bin Sun, Suzhou (CN); Jian Zhang, Suzhou (CN); YueMin Li, Suzhou (CN); Peter J. Bisiules, LaGrange Park, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 30 days.

(21) Appl. No.: 18/836,519

(22) PCT Filed: Jan. 24, 2023

(86) PCT No.: PCT/US2023/061144
§ 371 (c)(1),
(2) Date: Aug. 7, 2024

(87) PCT Pub. No.: WO2023/154619
PCT Pub. Date: Aug. 17, 2023

(65) Prior Publication Data

US 2025/0118904 A1 Apr. 10, 2025

Related U.S. Application Data

(60) Provisional application No. 63/308,610, filed on Feb. 10, 2022.

(51) Int. Cl.
*H01Q 21/24* (2006.01)
*H01Q 7/00* (2006.01)
*H01Q 9/06* (2006.01)

(52) U.S. Cl.
CPC ............... *H01Q 21/24* (2013.01); *H01Q 7/00* (2013.01); *H01Q 9/065* (2013.01)

(58) Field of Classification Search
CPC ...... H01Q 1/523; H01Q 21/24; H01Q 1/2283; H01Q 1/246; H01Q 5/335; H01Q 5/50;
(Continued)

(56) References Cited

U.S. PATENT DOCUMENTS

2015/0070234 A1 3/2015 Jones
2015/0214634 A1 7/2015 Lee et al.
(Continued)

FOREIGN PATENT DOCUMENTS

CN 113964504 A 1/2022
WO 2016011977 A1 1/2016
WO 2023108630 A1 6/2023

OTHER PUBLICATIONS

Notification of Transmittal of the International Search Report and the Written Opinion of the International Searching Authority, or the Declaration, in corresponding PCT Application No. PCT/US2023/061144 (May 26, 2023).

*Primary Examiner* — Wei (Victor) Y Chan
(74) *Attorney, Agent, or Firm* — Myers Bigel, P.A.

(57) ABSTRACT

A cross-polarized dipole radiating element includes: (i) a substrate having a quad-arrangement of radiating arms on a forward-facing surface thereof, and a radio-frequency (RF) coupled loop on a rear-facing surface thereof, and (ii) a feed stalk electrically coupled to the quad-arrangement of radiating arms. The RF coupled loop can include a quad-arrangement of rear-facing coupling elements, which extend opposite corresponding ones of the quad-arrangement of radiating arms, and a quad-arrangement of metal traces,
(Continued)

which are configured to electrically couple the quad-arrangement of coupling elements together into a closed electrical loop.

12 Claims, 4 Drawing Sheets

(58) Field of Classification Search
CPC ...... H01Q 21/26; H01Q 3/267; H01Q 19/108; H01Q 21/0006; H01Q 21/062; H01Q 5/378; H01Q 7/00; H01Q 9/065
See application file for complete search history.

(56) References Cited

U.S. PATENT DOCUMENTS

2018/0323513 A1 11/2018 Varnoosfaderani et al.
2020/0274256 A1* 8/2020 Biscontini ................ H01Q 9/28
2021/0210840 A1* 7/2021 Xu ......................... H01Q 21/26
2025/0125540 A1* 4/2025 Ai ......................... H01Q 15/006

* cited by examiner

COMPACT CROSS-POLARIZED DIPOLE RADIATING ELEMENTS HAVING EMBEDDED COUPLING LOOPS THEREIN

FIELD

The present invention relates to cellular communications systems and, more particularly, to radiating elements used in base station antenna systems.

BACKGROUND

Crossed dipole radiating elements can generate isotropic, omnidirectional, dual-polarized, and circularly polarized radiation; and, when combined into arrays of multiple radiating elements, may be suitable for single-band, multiband, and wideband wireless communication systems. These systems include, but are not limited to, broadcasting services, satellite communications, mobile communications, global navigation satellite systems, radio frequency (RF) identification, wireless power transmission, wireless local area networks, and other wireless communications.

The basic design of a conventional cross dipole radiating element consists of a pair of two half-wavelength dipoles, which are aligned at right angles relative to each other and may be supplied with currents of equal magnitude that are in phase quadrature in some applications. In addition to wireless communications, many other applications similarly require antennas that radiate a unidirectional pattern with significant front-to-back ratio to ensure high security and efficiency in the propagation channels. Accordingly, such antennas typically utilize rear-side reflectors that support generation of the unidirectional pattern with dual polarization.

With the rapid development of today's wireless communication markets, demands for improved antenna design have focused on: compact size, higher radiation efficiencies, broader bandwidths, multiple bands, specific radiation profiles with improved return loss (RL) and isolation (ISO), ease of fabrication and integration, and lower cost.

SUMMARY

A cross-polarized dipole radiating element according to an embodiment of the invention utilizes an embedded rear-facing loop to achieve compact size, excellent impedance matching, and improved roll-off, return loss and isolation. In some embodiments, the radiating element includes a substrate having a quad-arrangement of radiating arms on a forward-facing surface thereof, and a radio-frequency (RF) coupled loop on a rear-facing surface thereof, and a feed stalk electrically coupled to the quad-arrangement of radiating arms. A cross-polarized feed signal network may also be electrically coupled to a base of the feed stalk, and supported on an underlying reflector.

In some of these embodiments, the RF coupled loop includes a quad-arrangement of rear-facing coupling elements, which extend opposite corresponding ones of the quad-arrangement of radiating arms, and a quad-arrangement of metal traces, which are configured to electrically couple the quad-arrangement of coupling elements together into a closed electrical loop. The centroids of the quad-arrangement of coupling elements may be located at four corners of a square, when viewed from a plan perspective; each of the coupling elements may also have a circular, polygonal or similar shape, when viewed from the plan perspective. In some further embodiments, the metal traces may have a linear, arcuate or similar shape, when viewed from the plan perspective.

According to additional embodiments of the invention, a capacitance between each of the radiating arms and underlying coupling element is greater than 0.1 pF, whereas each of the metal traces has a length in a range between $0.125\lambda_0$ and $0.25\lambda_0$, where $\lambda_0$ corresponds to a wavelength associated with a center frequency of an operating band of the radiating element. The substrate may also be polygonal-shaped, and the quad-arrangement of radiating arms may fully or only partially cover the forward-facing surface of the substrate. A ratio of an area of each radiating arm relative to an area of a corresponding coupling element may also be in a range from 6 to 24.

According to further embodiments of the invention, a cross-polarized dipole radiating element is provided, which includes a substrate having a quad-arrangement of radiating arms on a forward-facing surface thereof, and a radio-frequency (RF) coupled loop on a rear-facing surface thereof. This RF coupled loop includes a quad-arrangement of circular or polygonal-shaped coupling elements that are electrically coupled together, and overlap centroids of their respective radiating arms when viewed from a plan perspective. A rearwardly-extending feed stalk is also provided, which is electrically coupled at one end to the quad-arrangement of radiating arms, and at its base to a cross-polarized feed signal network. In some embodiments, the centroids of the quad-arrangement of coupling elements are located at four corners of a square, when viewed from the plan perspective. The centroids of the coupling elements may also be aligned with corresponding centroids of the radiating arms when viewed from the plan perspective. A quad-arrangement of metal traces may also be provided, which are configured to electrically couple the quad-arrangement of coupling elements together into a closed electrical loop. Each of the metal traces may have a length in a range between $0.125\lambda_0$ and $0.25\lambda_0$, where $\lambda_0$ corresponds to a wavelength associated with a center frequency of an operating band of the radiating element. A capacitance between each of the coupling elements and a corresponding radiating arm may also be greater than 0.1 pF.

According to still further embodiments of the invention, a cross-polarized dipole radiating element is provided, which includes a substrate having: (i) a quad-arrangement of radiating arms on a forward-facing surface thereof, and (ii) an electrically conductive loop on a rear-facing surface thereof. This electrically conductive loop includes a quad-arrangement of metal traces that are electrically connected together, end-to-end, by a quad-arrangement of electrically conductive nodes, which are electrically connected by plated through-holes in the substrate to corresponding ones of the radiating arms. The plated through-holes may be located at four corners of a square when viewed from a plan perspective, and each of the metal traces may have a length in a range between $0.17\lambda_0$ and $0.34\lambda_0$, where $\lambda_0$ corresponds to a wavelength associated with a center frequency of an operating band of the radiating element. A feed stalk may also be provided, which is electrically coupled to the quad-arrangement of radiating arms.

DETAILED DESCRIPTION

Figure 1A:
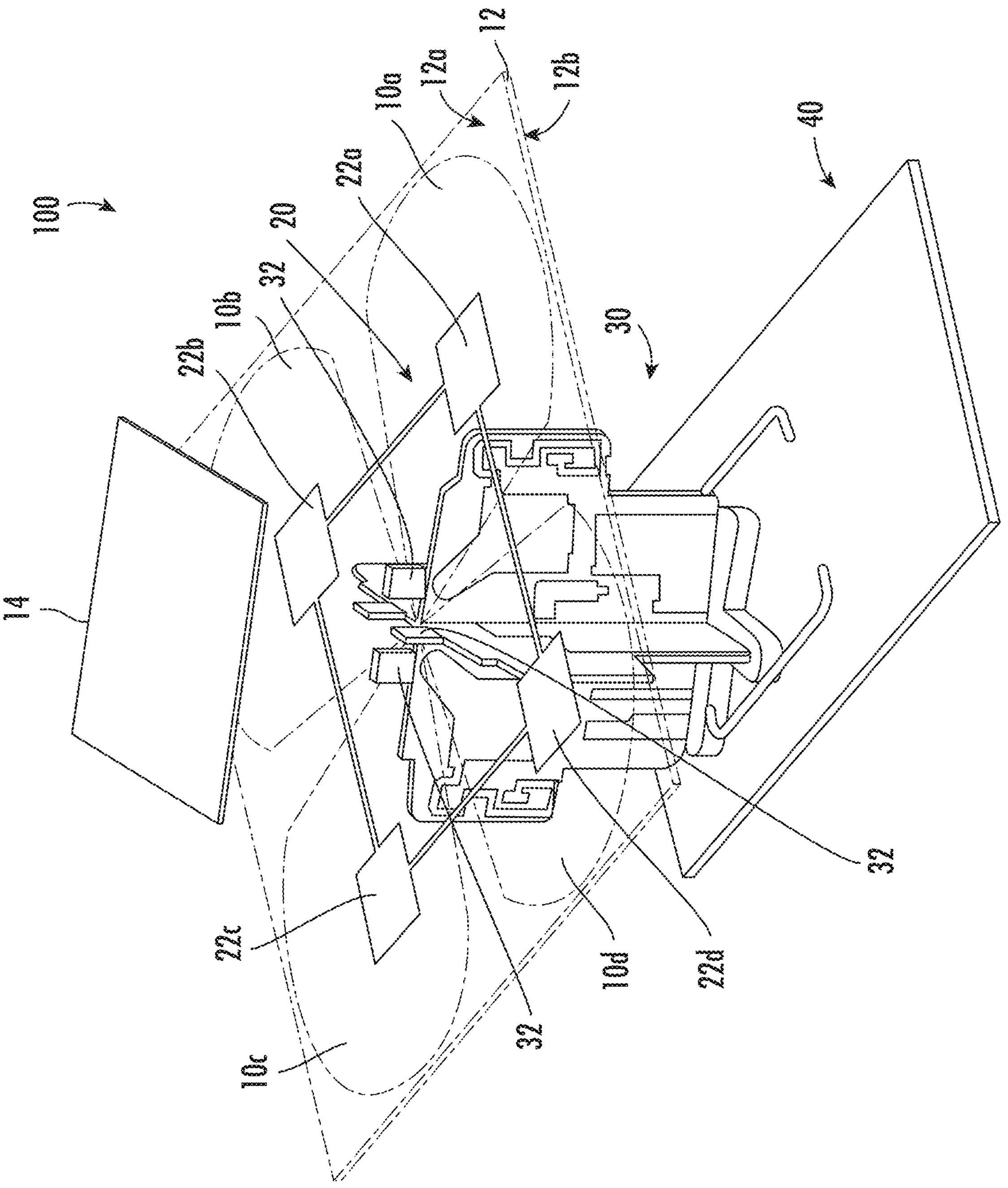
FIG. 1A is a perspective view of a cross-polarized dipole radiating element according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
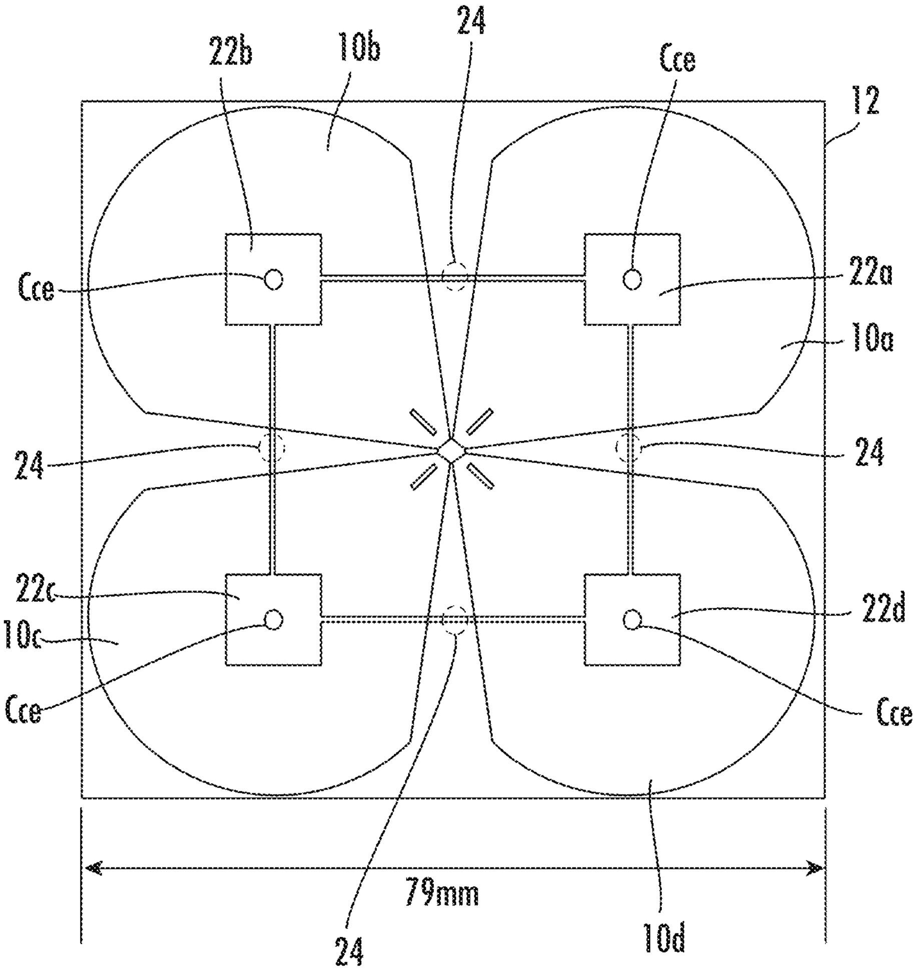
FIG. 1B is a plan view of a substrate having a forward-facing surface, which contains a quad-arrangement of radiating arms, and a rear-facing surface, which contains an RF coupled loop, according to the radiating element of FIG. 1A.
Figure 1C:
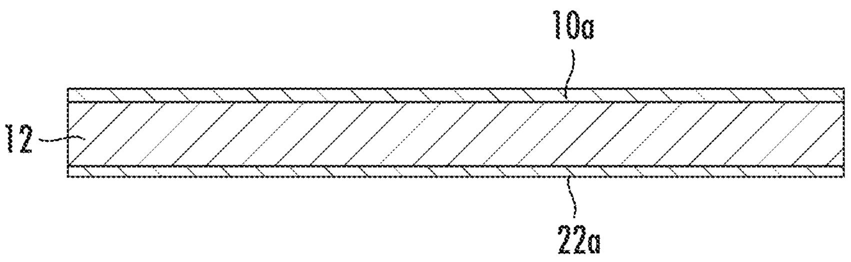
FIG. 1C is a cross-sectional view of a portion of the substrate of FIG. 1B.

Referring now to FIGS. 1A-1C, a cross-polarized dipole radiating element 100 according to an embodiment of the invention includes a substrate 12 having a quad-arrangement of radiating arms 10*a*-10*d* on respective portions of a forward-facing surface 12*a* of the substrate 12, and a radio-frequency (RF) coupled loop 20 on a rear-facing surface 12*b* of the substrate 12. A rearwardly-extending feed stalk 30 is also provided, which is electrically coupled by four feed stalk posts 32 to respective ones of the quad-arrangement of radiating arms 10*a*-10*d*, and is electrically coupled at its base to a cross-polarized feed signal network 40, that may be implemented in a feed board printed circuit board (PCB) that is typically supported on an underlying reflector (not shown). This cross-polarized feed signal network 40 may be configured as described in commonly assigned International Patent Application No. PCT/CN2021/139259, filed Dec. 17, 2021, the disclosure of which is hereby incorporated herein by reference. In some embodiments of the invention, the substrate 12 may be configured as a rectangular (e.g., square) PCB substrate, which preferably has reduced lateral dimensions of 79 mm by 79 mm, a thickness of 0.762 mm, and a dielectric constant of about 4.4, for example. A director 14 may also be provided at a fixed distance relative to the forward-facing surface of the substrate 12, to thereby operate as a passive beam focusing element.

Figure 2A:
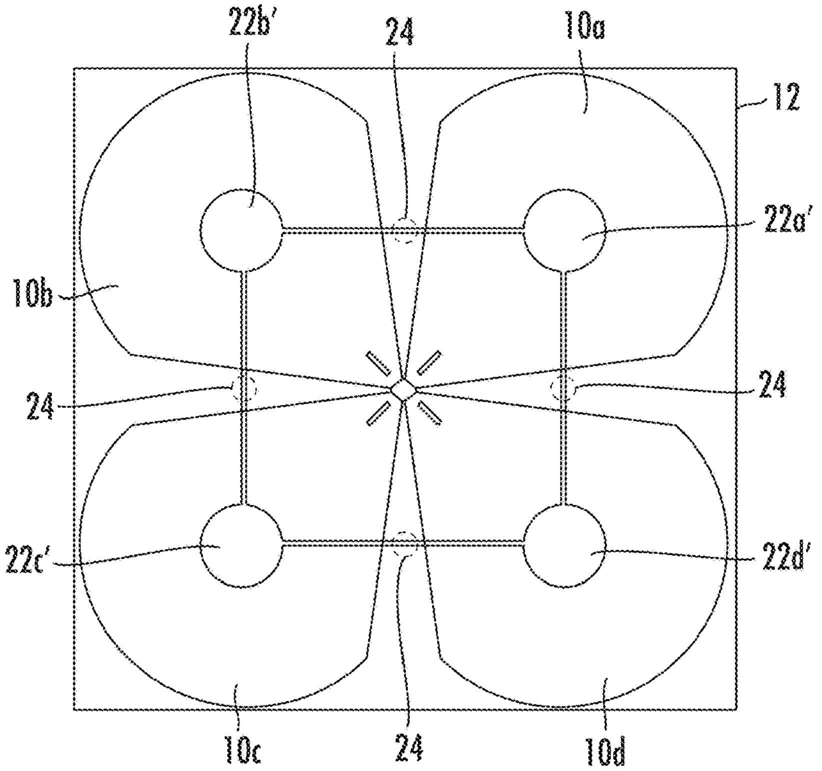
FIG. 2A is a plan view of a substrate having a forward-facing surface, which contains a quad-arrangement of radiating arms, and a rear-facing surface, which contains an RF coupled loop, according to an alternative embodiment of the radiating element of FIG. 1A.
Figure 2B:
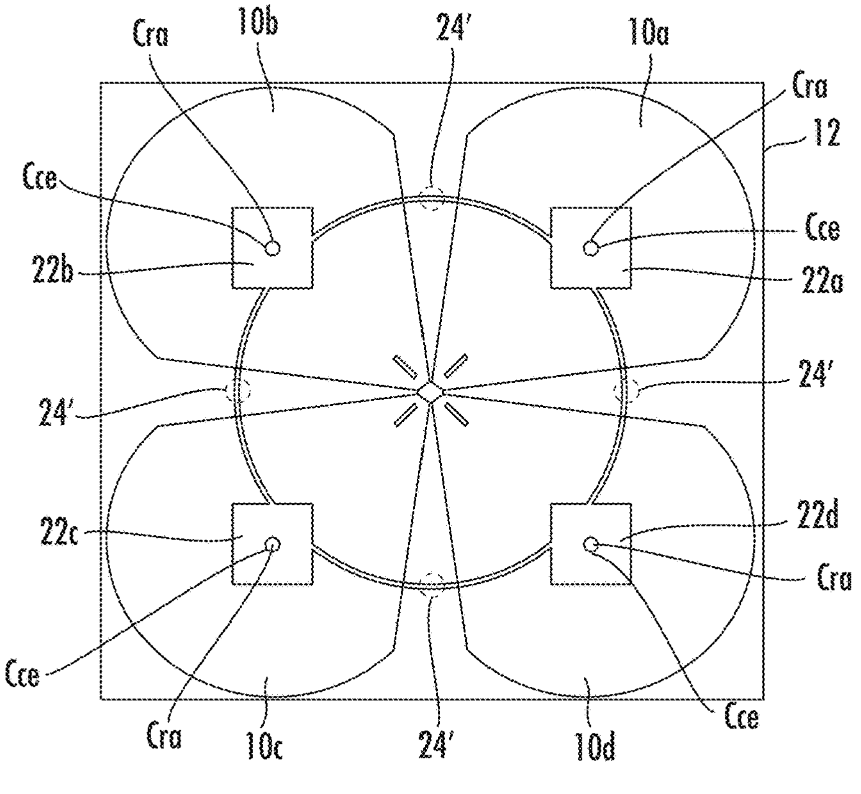
FIG. 2B is a plan view of a substrate having a forward-facing surface, which contains a quad-arrangement of radiating arms, and a rear-facing surface, which contains an RF coupled loop, according to an alternative embodiment of the radiating element of FIG. 1A.

According to some embodiments of the invention, the RF coupled loop 20 may include a quad-arrangement of coupling elements 22*a*-22*d*, which extend opposite corresponding ones of the quad-arrangement of radiating arms 10*a*-10*d*, and a quad-arrangement of metal traces 24, which are configured to electrically couple the quad-arrangement of coupling elements 22*a*-22*d* together into a closed electrical loop. As shown by FIG. 1B, centroids $C_{ce}$ of the quad-arrangement of coupling elements 22*a*-22*d* are located at four corners of a square, when viewed from a plan perspective. And, as shown best by the alternative embodiments of FIGS. 1B and 2A-2B, each of the coupling elements 22*a*-22*d*, 22*a*'-22*d*' in the quad-arrangement may have a polygonal (e.g., square) or circular shape, for example, and each of the metal traces 24, 24' in the quad-arrangement may have a linear, arcuate or other shape, when viewed from the plan perspective.

In addition, to achieve a desired degree of reactive coupling between the quad-arrangement of radiating arms 10*a*-10*d*, the quad-arrangement of coupling elements 22*a*-22*d*, and the quad-arrangement of metal traces 24, a capacitance between each of the coupling elements 22*a*-22*d* and a corresponding radiating arm 10*a*-10*d* can be greater than 0.1 pF, and each of the metal traces 24 may have a length in a range between $0.125\lambda_0$ and $0.25\lambda_0$, where $\lambda_0$ corresponds to a wavelength associated with a center frequency of an operating band of the radiating element. In addition, according to further embodiments of the invention, a ratio of an area of each radiating arm 10*a*-10*d* relative to an area of a corresponding coupling element 22*a*-22*d* may be in a range from 6 to 24, a width of each of the metal traces 24 may be about 0.5 mm, and a resistance of each of the metal traces 24 may be about 60-100 ohms. Moreover, according to further embodiments of the invention, centroids $C_{ce}$ of the quad-arrangement of coupling elements 22*a*-22*d* may be "vertically" aligned with the centroids $C_{ra}$ of the radiating arms when viewed from the plan perspective.

Figure 3A:
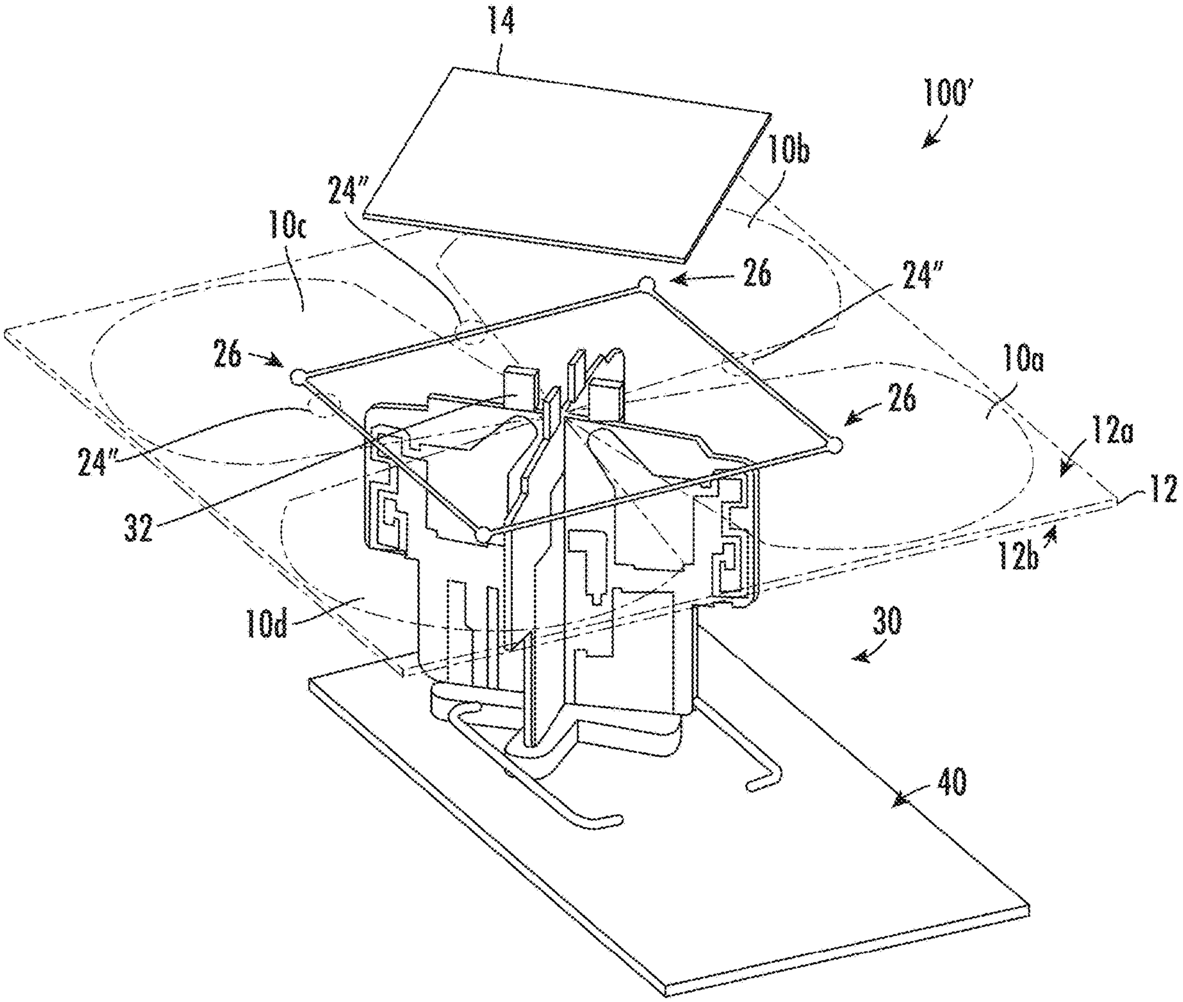
FIG. 3A is a perspective view of a cross-polarized dipole radiating element according to another embodiment of the invention.
Figure 3B:
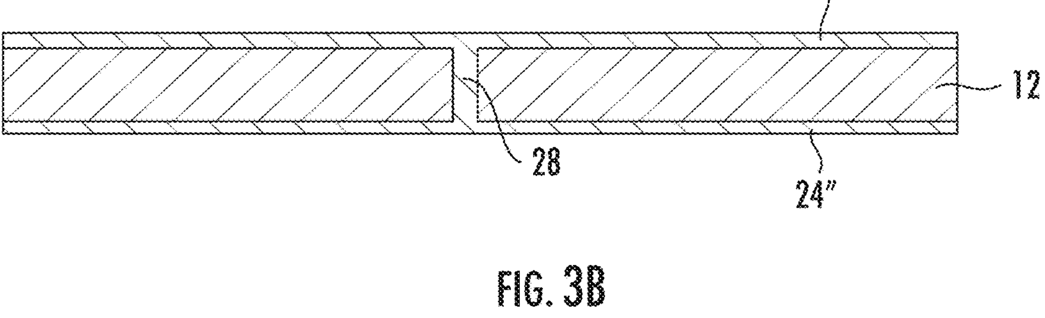
FIG. 3B is a cross-sectional view of a portion of a substrate within the radiating element of FIG. 3A.

Referring now to FIGS. 3A-3B, a cross-polarized dipole radiating element 100' according to another embodiment of the invention includes a substrate 12 having a quad-arrangement of radiating arms 10*a*-10*d* on respective portions of a forward-facing surface 12*a* thereof, and an electrically coupled loop 20' on a rear-facing surface 12*b* thereof. As with the embodiment of FIG. 1A, a feed stalk 30 is also provided, which is electrically coupled by four feed stalk posts 32 to respective ones of the quad-arrangement of radiating arms 10*a*-10*d*, and is electrically coupled at its base to a cross-polarized feed signal network 40. As shown, the electrically coupled loop 20' includes a quad-arrangement of metal traces 24" that are electrically connected together, end-to-end, by a quad-arrangement of electrically conductive nodes 26, which are electrically connected by plated through-holes 28 in the substrate 12 to corresponding ones of the radiating arms 10*a*-10*d*. These plated through-holes 28 may be filled (e.g., with solder) or unfilled. According to some of these embodiments, the plated through-holes 28 are located at four corners of a square when viewed from the plan perspective, and the metal traces 24" may each have a length in a range between $0.17\lambda_0$ and $0.34\lambda_0$.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A cross-polarized dipole radiating element, comprising:

a substrate having a quad-arrangement of radiating arms formed on a forward-facing surface thereof, and a radio-frequency (RF) coupled loop formed on a rear-facing surface thereof; and a feed stalk electrically coupled to the quad-arrangement of radiating arms, wherein the RF coupled loop comprises:

a quad-arrangement of coupling elements, which extend opposite corresponding ones of the quad-arrangement of radiating arms; and a quad-arrangement of metal traces, which are configured to electrically couple the quad-arrangement of coupling elements together into a closed electrical loop, and wherein centroids of the quad-arrangement of coupling elements are located at four corners of a square, when viewed from a plan perspective, and wherein each metal trace in the quad-arrangement of metal traces extends at least partly within the square.

2. The radiating element of claim 1, wherein each of the coupling elements in the quad-arrangement have a circular or polygonal shape, when viewed from the plan perspective.

3. The radiating element of claim 1, wherein each of the metal traces in the quad-arrangement have a linear or arcuate shape, when viewed from the plan perspective.

4. The radiating element of claim 1, wherein a capacitance between each of the coupling elements and a corresponding radiating arm is greater than 0.1 pF.

5. The radiating element of claim 1, wherein each of the metal traces has a length in a range between $0.125\lambda_0$ and $0.25\lambda_0$, where $\lambda_0$ corresponds to a wavelength associated with a center frequency of an operating band of the radiating element.

6. The radiating element of claim 1, wherein a capacitance between each of the coupling elements and a corresponding radiating arm is greater than 0.1 pF; and wherein each of the metal traces has a length in a range between $0.125\lambda_0$ and $0.25\lambda_0$, where $\lambda_0$ corresponds to a wavelength associated with a center frequency of an operating band of the radiating element.

7. The radiating element of claim 1, further comprising a cross-polarized feed signal network electrically coupled to a base of the feed stalk.

8. The radiating element of claim 1, wherein the substrate is polygonal-shaped; and wherein the quad-arrangement of radiating arms only partially cover the forward-facing surface of the substrate.

9. The radiating element of claim 1, wherein a ratio of an area of each radiating arm relative to an area of a corresponding coupling element is in a range from 6 to 24.

10. A cross-polarized dipole radiating element, comprising:

a substrate having a quad-arrangement of radiating arms on a forward-facing surface thereof, and a radio-frequency (RF) coupled loop on a rear-facing surface thereof, which comprises a quad-arrangement of circular or polygonal-shaped coupling elements that are electrically coupled together and overlap centroids of their respective radiating arms when viewed from a plan perspective;

a quad-arrangement of metal traces, which are configured to electrically couple the quad-arrangement of coupling elements together into a closed electrical loop; and a feed stalk electrically coupled to the quad-arrangement of radiating arms, wherein centroids of the quad-arrangement of coupling elements are located at four corners of a square, when viewed from the plan perspective, and wherein centroids of the quad-arrangement of coupling elements are aligned with the centroids of the radiating arms when viewed from the plan perspective.

11. The radiating element of claim 10, wherein each of the metal traces has a length in a range between $0.125\lambda_0$ and $0.25\lambda_0$, where $\lambda_0$ corresponds to a wavelength associated with a center frequency of an operating band of the radiating element.

12. The radiating element of claim 10, wherein a capacitance between each of the coupling elements and a corresponding radiating arm is greater than 0.1 pF.

* * * * *